United States Patent
Guidice et al.

(10) Patent No.: US 6,463,420 B1
(45) Date of Patent: Oct. 8, 2002

(54) ONLINE TRACKING OF DELIVERY STATUS INFORMATION OVER A COMPUTER NETWORK

(75) Inventors: Rebecca R. Guidice, Charlotte, NC (US); Bruce J. McDonald, Charlotte, NC (US); Scott M. Dix, Huntersville, NC (US); John A. Moore, Charlotte, NC (US); Timothy L. Atwell, Charlotte, NC (US); Aaron M. Linz, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/498,464

(22) Filed: Feb. 4, 2000

(Under 37 CFR 1.47)

Related U.S. Application Data

(60) Provisional application No. 60/173,799, filed on Dec. 30, 1999.

(51) Int. Cl.[7] .................................. G06F 17/00
(52) U.S. Cl. .............................. 705/28; 705/26
(58) Field of Search ................. 705/26–28, 1; 235/375; 707/1, 10

(56) References Cited

U.S. PATENT DOCUMENTS

| | | | |
|---|---|---|---|
| 5,063,507 A | | 11/1991 | Lindsey et al. |
| 5,285,383 A | | 2/1994 | Lindsey et al. |
| 5,319,542 A | | 6/1994 | King et al. |
| 5,631,827 A | * | 5/1997 | Nicholls et al. ............... 705/28 |
| 5,774,873 A | | 6/1998 | Berent et al. |
| 5,963,915 A | | 10/1999 | Kirsch et al. |
| 6,047,264 A | * | 4/2000 | Fisher et al. ................... 705/28 |
| 6,220,509 B1 | * | 4/2001 | Byford ........................... 705/1 |

FOREIGN PATENT DOCUMENTS

EP    1094414    *    4/2001

OTHER PUBLICATIONS

*Informationweek* article "Rule No. 1: Don't annoy your customers" (dated Dec. 13, 1999).*
*PR Newswire* article "En Pointe Announces . . . Calculate Pricing" (dated Oct. 16, 1998).*
*Manufacturing Systems* article "Conquer the challenge" (dated Feb. 1999).*

* cited by examiner

Primary Examiner—Dean J. Kramer
(74) Attorney, Agent, or Firm—John B. Yates, Esq.; Robin C. Clark, Esq.; Hunton & Williams

(57) ABSTRACT

A method and system for tracking, over a computer network, orders placed with a supplier and shipped by any of a variety of different carriers, the tracking taking place entirely within the confines of the supplier's web site. By providing for electronic communication of delivery status information between a variety of different carriers and the supplier's server, the supplier is able to provide online tracking information to a customer regardless of the individual manner of delivery.

22 Claims, 5 Drawing Sheets

ONLINE TRACKING OF DELIVERY STATUS INFORMATION OVER A COMPUTER NETWORK

CROSS REFERENCE TO RELATED APPLICATIONS

This application claims the benefit of provisional patent application Ser. No. 60/173,799 filed Dec. 30, 1999, the disclosure of which is incorporated herein by reference.

BACKGROUND OF THE INVENTION

The present invention relates generally to conducting electronic commercial transactions over a computer network. More particularly, the present invention relates to comprehensive online tracking of shipment information over a computer network.

Electronic commerce systems for conducting commercial transactions over a computer network, such as the Internet, are shown and described in numerous U.S. patents, including U.S. Pat. Nos. 5,285,383 and 5,063,507 to Lindsey et al., U.S. Pat. No. 5,963,915 to Kirsch et al., U.S. Pat. No. 5,319,542 to King et al., and U.S. Pat. No. 5,774,873 to Berent et al.

U.S. Pat. No. 5,319,542 to King et al., for example, discloses a system for ordering items from a supplier. The system includes an electronic catalogue and an electronic requisition facility. The catalogue includes a public-access portion, stored on a publicly-accessible database for access by customers, and a private portion, stored on a customer's computer system. The private portion contains unique pricing data based on pricing agreements. Customers use the electronic requisition facility to create purchase requisitions based on the information in the electronic catalogue. The requisitions are routed through an appropriate approval process, processed through the customer's procurement system, and transmitted to the supplier.

In combination with systems such as the one described above, it is often useful for the customer to be able to track the progress of its shipment, so as to more accurately predict the arrival date and time of the order. In response to this demand, many well known carriers such as United Parcel Service (UPS) and Federal Express (FedEx) provide online tracking of orders over the world wide web. Each shipment is provided with a tracking number, often in the form of a bar code, which uniquely identifies the items in the shipment. This barcode is scanned at various waypoints during the shipping process, thereby identifying the most recent location of the shipment. By entering in the order's tracking number at the delivery vendor's web site, customers can track the progress of their order.

Unfortunately, conventional types of online order tracking systems require customers to leave the supplier's web site and navigate to the carrier's web site to obtain tracking information. This is undesirable and inconvenient when the customer wishes to conduct further business with the supplier. Further, not all carriers provide for online tracking of shipments. In particular, many smaller carriers have neither the resources nor the capabilities to implement such a feature. Also, because many suppliers ship orders with a large number of individual carriers, it is often inconvenient for a customer to navigate to several carriers' web sites and input various different tracking numbers in order to determine the status of their orders.

It would be desirable to improve the convenience and efficiency of electronic commerce transactions by providing for tracking of particular orders wholly within the confines of the supplier's web site, without the need for the customer to navigate off of the supplier's site.

It would further be desirable to provide for on-site tracking of orders deliverable by multiple different carriers, particularly where alternative forms of online order tracking for a given carrier may not be available.

BRIEF SUMMARY OF THE INVENTION

The present invention overcomes the problems noted above, and provides additional advantages, by providing for a method and system for the online tracking of orders placed with a supplier and shipped by any of a variety of different carriers, entirely within the confines of the supplier's web site. A method in accordance with an exemplary embodiment of the invention is performed by providing for electronic communication of delivery status information between a variety of different carriers and the supplier's server. In response to a request by a customer, the method further provides through a supplier's web site on the World Wide Web, an interface allowing a user to track the delivery status of any submitted order, regardless of the individual carrier shipping the order.

Methods, systems and programs in accordance with the present invention greatly increase the efficiency and convenience of tracking the delivery status of orders placed over a computer network.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
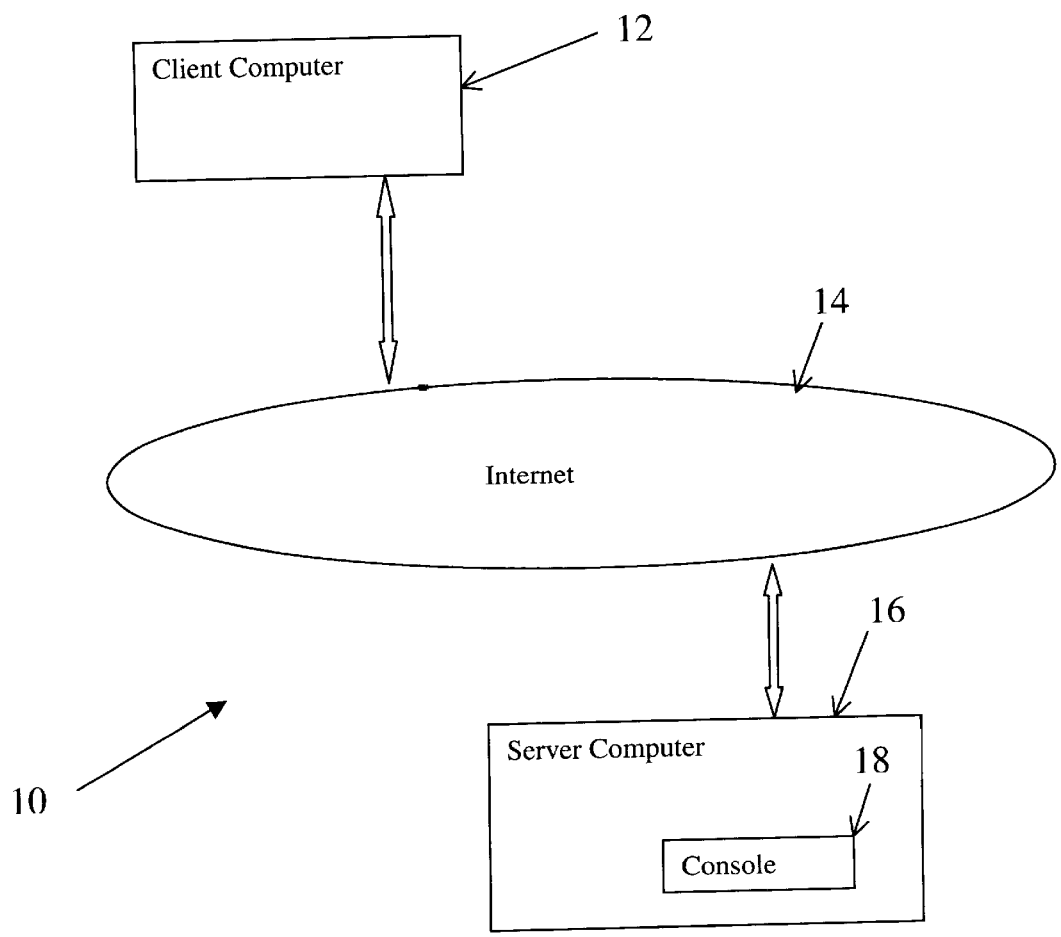
FIG. 1 is a block diagram of a computer network suitable for implementing a method according to the present invention.

An Internet computer system 10 is generally illustrated in FIG. 1. A conventional client computer system 12, executing a client browser application that supports the HTTP protocol, is connected typically through an Internet Service Provider (ISP) to the Internet 14. A server computer system 16 is also coupled typically through an Internet Service Provider to the Internet 14. The server computer system 16, controlled by a local console 18, executes a Web server application conventionally known as a HTTPd server. In addition, the server computer system 16 preferably provides local storage for at least one, though typically many Web pages.

The client computer system requests a Web page by issuing a URL request through the Internet 14 to the server system 16. A URL consistent with the present invention may be a simple URL of the form:

<protocol_identifier>://<server_path>/<web_page_path>

A "protocol_identifier" of "http" specifies the conventional hyper-text transfer protocol. A URL request for a secure Internet transaction typically utilizes the secure protocol identifier "https," assuming that the client browser and Web server are presumed to support and implement the secure sockets layer (SSL). The "server_path" is typically of the form "prefix.domain," where the prefix is typically "www" to designate a Web server and the "domain" is the standard Internet sub-domain.top-level-domain of the server system 16. The optional "web_page_path" is provided to specifically identify a particular hyper-text page maintained by the Web server.

In response to a received URL identifying an existing Web page, the server system 16 returns the Web page, subject to the HTTP protocol, to the client computer system 12. This Web page typically incorporates both textural and graphical information including embedded hyper-text links that permit the client user to readily select a next URL for issuance to the Internet 14.

The URL issued from the client system 12 may also be of a complex form that identifies a common gateway interface (CGI) program on a server system 16. Such a HTML hyperlink reference is typically of the form:

<form action="http://www.vendor.com/cgi-bin/logon.cgi" method=post>

A hyper-text link of this form directs the execution of the logon.cgi program on an HTTP server in response to a client side selection of an hyperlink. A logon form supported by a logon CGI program is typically used to obtain a client user login name and password to initiate an authenticated session between the client browser and Web server for purposes of supporting, for example, a secure purchase transaction.

Figure 2:
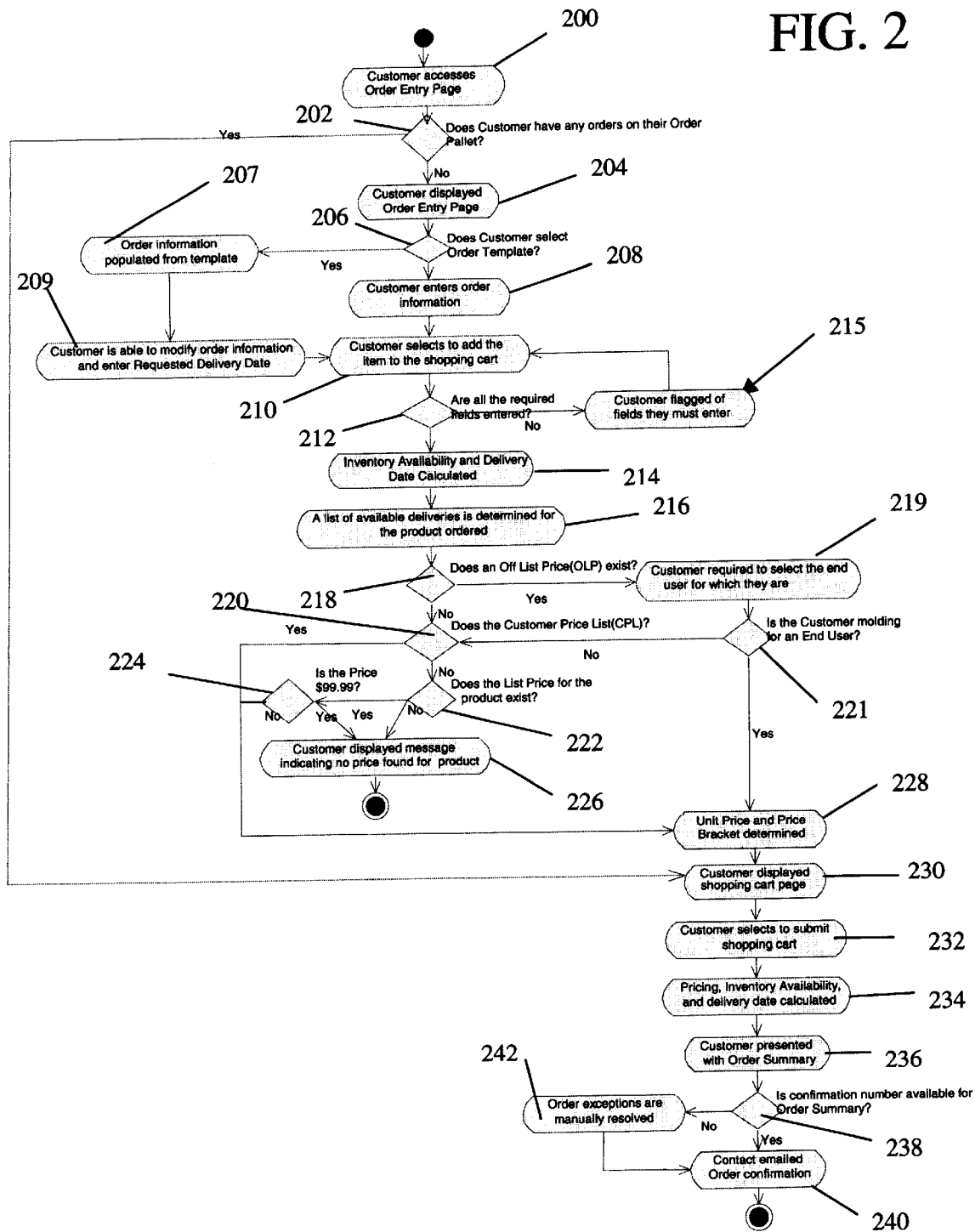
FIG. 2 is a flow chart describing a process for conducting a commercial transaction involving the purchase of an item over the network of FIG. 1.

Referring now to FIG. 2, there is illustrated a flow chart describing a method for processing an order for an item over a network (e.g., as shown and described above). This method can be implemented by a software program resident in one or more servers associated with the supplier. This method assumes the use of a so-called "shopping cart" purchase model, in which a user can select any number of desired items, which are then separately stored as a list (or "cart") of desired items; when the user is ready to complete the transaction, the list is recalled and the user can then proceed to purchase the items. It will of course be appreciated that other purchasing models may be used. In step 200, the customer accesses an order entry web page via the network. In step 202, it is determined whether the customer has any orders currently awaiting processing (e.g., in a "shopping cart" or list of desired items which the user has not yet purchased). If it is determined that the user does have orders awaiting processing, the process proceeds in a manner to be described below. If it is determined in step 202 that the user does not have any orders awaiting processing, the process continues in step 204, where the server causes an order entry page to be displayed to the user on the user's computer. In this embodiment, the entry order page presents the user with an option of using a previously entered order template. Such an order template would preferably include information material to the purchase of particular product (e.g., part number, product identification number, product description, quantity, and shipping address) and would increase the speed and simplicity in the event a re-order is required, by eliminating the need for the customer to re-enter this information.

In step 206, if the user selects an order template, the process proceeds in a manner to be described below. If, on the other hand, the user does not select an order template, the process proceeds to step 208, where the customer enters order information through the interface, and the supplier's server receives this order information. In step 210, the user indicates to the supplier server, via the interface and the network, that the user has finished entering the order information. If the user had selected the use of an order template in step 206, then in step 207 the server causes order information to be populated from the template, and in step 209, the customer is allowed to modify the order information provided from the template and to enter additional information not provided in the template such as a requested delivery date.

In step 212, the server determines if all required fields (that is, all information required to process the order) have been entered. If required information is missing, the customer is so informed (e.g., by flagging the fields that require information) in step 215, and the process returns to step 210. If there is no required information missing, the process continues to step 214, where the server examines an inventory database to determine whether the ordered item(s) are presently in inventory, and determines an estimated delivery date for the ordered item(s). In step 216, a list of potential delivery dates or times is determined for the ordered item(s).

In step 218, the server determines whether an off list price (OLP), or discounted price, is available for the ordered item(s). If such an alternative price exists, the process continues to step 219, where the customer or user is requested to identify the end user of the product on whose behalf the user is purchasing the product. In step 221, whether or not the customer or user can identify an end user for which the product or item is intended determines whether the OLP, or some other price, will be applied. If a specific end user is identified, the process continues to determine a price and/or price bracket as will be described in more detail below. If the purchaser is not ordering the item(s) on behalf of some other end user, the process continues to step 220, where it is determined whether a customer price list (CPL) exists for the ordered item(s). If such a CPL exists, the process jumps to step 228, where a unit price and price breakdown are determined in a manner to be described below.

If such a CPL is determined not to exist in step 220, then the process continues to step 222, where it is determined whether a list price exists. If a list price exists, it is determined whether that list price is equal to a predetermined default value representing an insufficient order quantity (in this example, $99.99) in step 224. If a list price is found not to exist in step 222, or if the list price is found to be a default value, step 226 will cause the customer to be informed that there is no price found for the product, and the process will end. If a list price is found to exist, and the list price is not a default value, or if the customer is purchasing a product on behalf of another user, the process continues to step 228, where a unit price and price bracket are determined.

In step 230, the customer is presented with an "shopping cart" page which displays all the information entered (or populated by a template) during the ordering process for each non-submitted order. In step 232, the customer submits the shopping cart to the supplier. In response to this submission, in step 234, the pricing, inventory availability, and delivery date are be calculated, and in step 236, the customer is presented with an order summary.

In step 238, it is determined whether an order confirmation number is available for the customer's order. If such a number is available, it is provided to the customer in step 240 (e.g., by automatically causing an electronic mail message to be sent), and if such a number is not available, the order exceptions are resolved in step 242, and the number is provided to the customer at a later time.

It should be understood that the network of FIG. 1 and the electronic commerce method of FIG. 2 are merely exemplary models used to illustrate the environment in which the present invention may be used. The present invention may be used with any suitable network or electronic commerce method and should not be limited to those described above.

Figure 3:
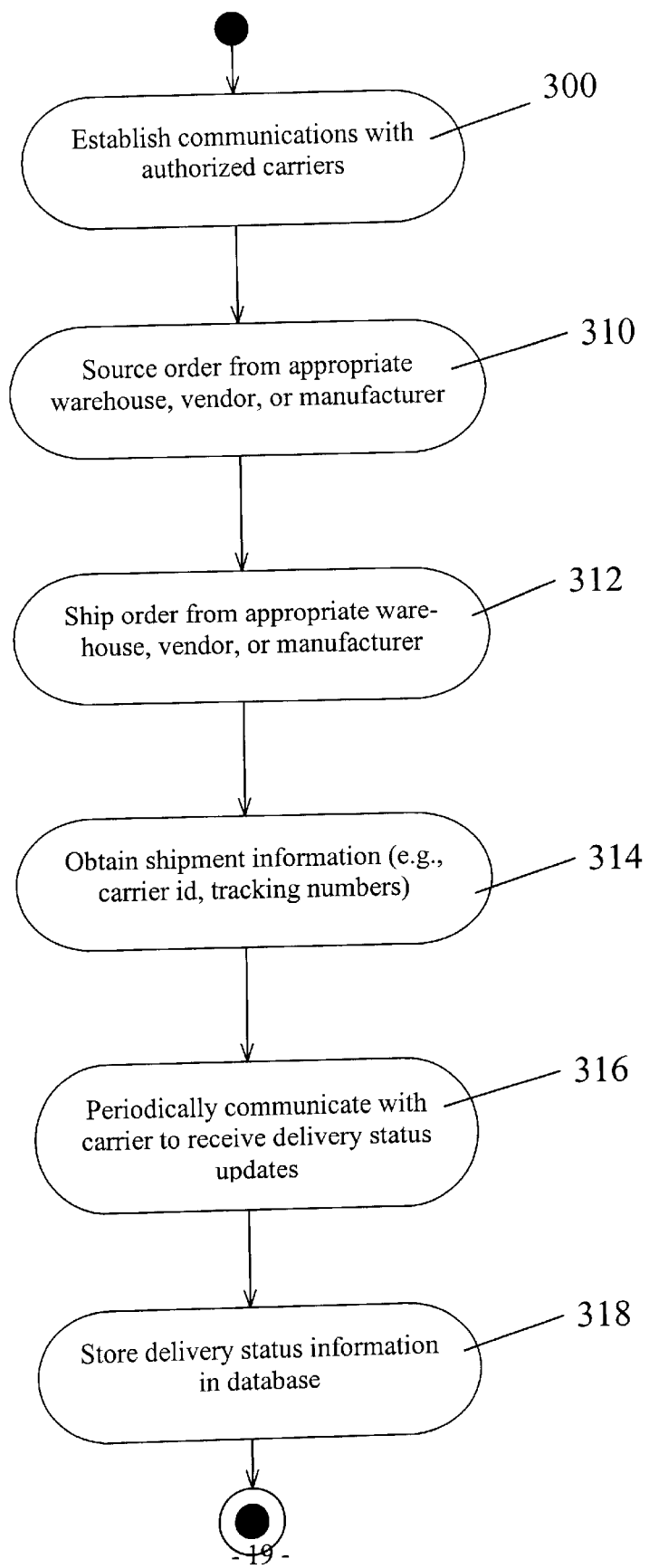
FIG. 3 is a flow chart describing a process for enabling suppliers to track the delivery status of orders placed in the commercial transaction of FIG. 2.

Referring now to FIG. 3, there is illustrated a flow chart describing a method for enabling suppliers to track the delivery status of orders from multiple carriers over a computer network in accordance with the present invention. In step 300, the supplier establishes communication with all of the carriers authorized to deliver orders. The term "carriers" refers to any entity which delivers a product to a customer and may include commercial delivery services, in-house warehouses, and third party vendors.

Communication with the carriers may take any suitable form that permits the exchange of tracking information between the carrier and the supplier. One example of a suitable communication format is electronic data interchange (EDI). EDI communication is done either individually or through a third party clearing house known as a Value Added Network (VAN) which then establishes the required communications with each individual carrier. EDI is often referred to as the electronic exchange of information between two business concerns in a specific pre-determined format. The benefits of EDI include the ability to transfer large quantities of information in a short amount of time, without requiring the need for personal contact, physical handling of papers, or re-entry of data. However, in order to make EDI work, all parties concerned must be capable of sending and receiving information in a standard format regardless of the particular system being used by each party.

A second form of communication suitable for use with the present invention is personal contact between the carriers and the supplier. This form of communication facilitates manual entry of information by customer service personnel in circumstances where electronic information cannot be obtained. The supplier's customer service personnel periodically contact the carriers through conventional means (e.g., electronic mail, telephone, etc.) and hand key the information obtained into the system. Alternatively, the carrier may themselves manually enter the information into the supplier's system through a suitable interface.

In step 310, the supplier sources the order from appropriate warehouse(s), outside vendor(s), or manufacturing facilities for delivery to the customer. In accordance with the supplier's sourcing, at step 312, the warehouse, vendor, or manufacturer ships the order using any of a variety of authorized carrier services, including their own in house carriers. In step 314, the warehouse, vendor, or manufacturer returns a description of all pertinent shipping information (e.g., carrier used, tracking numbers, etc.) associated with a particular order. The supplier, in step 316, then periodically (and automatically) communicates with the appropriate carrier(s) and tracks the delivery status of the relevant order. As described above, this communication may take any suitable form including, but not limited to, EDI, seamless web site integration, and personal contact. The carriers return the relevant information to the supplier, which is then stored in a database for future access by the system in step 318. In this manner, the supplier maintains a complete database of delivery information for all orders placed within a predetermined period of time (e.g., the last 30 days) from all authorized carriers. This information is maintained completely separate from the carrier's own online tracking information and is therefore not subject to disruptions in the carrier's service. It should be noted that in the case of seamless web site integration, tracking information regarding the delivery status of an order may also be requested and obtained by the supplier only upon customer request. Since the response is immediate, periodic automated communication with the carrier is not necessary. This provides customers with the most recent tracking information for their order.

Figure 4:
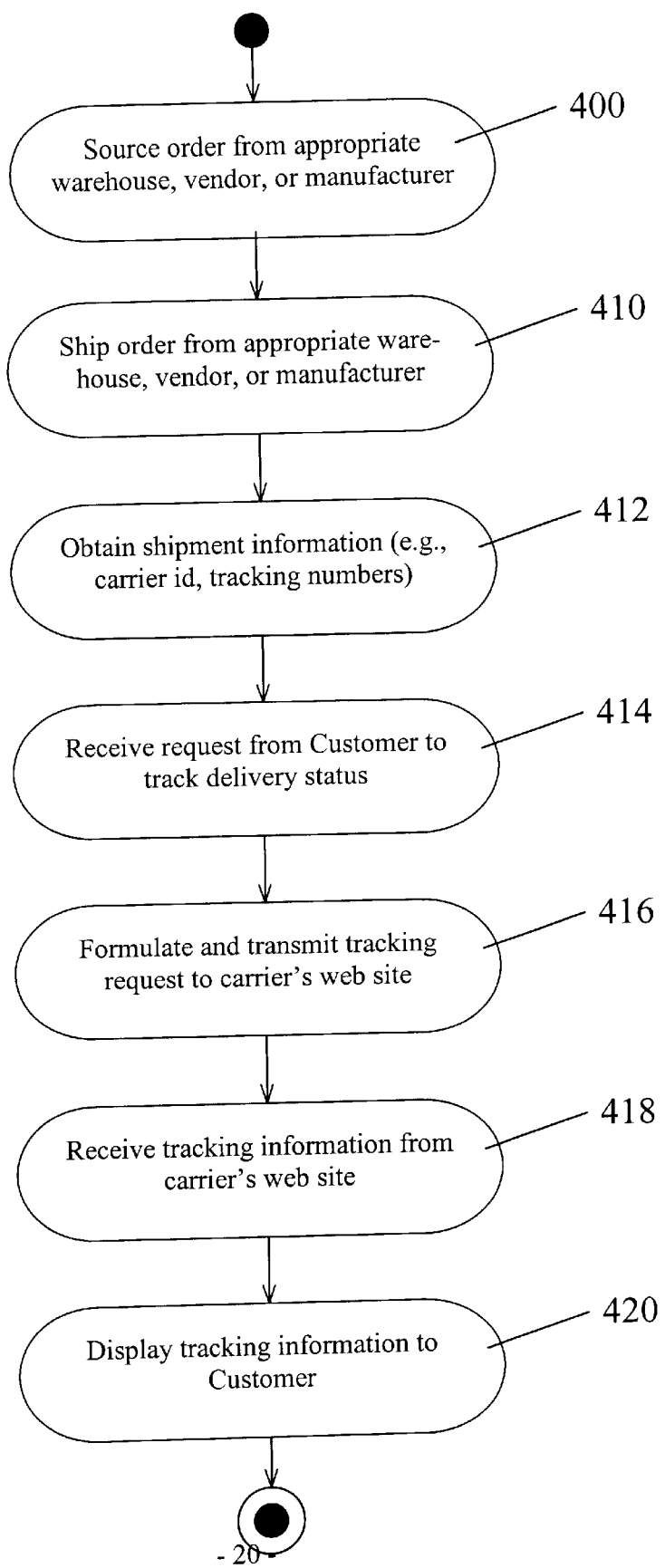
FIG. 4 is a flow chart describing a second process for enabling suppliers to track the delivery status of orders placed in the commercial transaction of FIG. 2.

Referring now to FIG. 4, there is illustrated a flow chart describing a second embodiment of a method for enabling suppliers to track the delivery status of orders from multiple carriers over a computer network in accordance with the present invention. In step 400, the supplier sources an order from an appropriate warehouse(s), outside vendor(s), or manufacturing facilities for delivery to the customer. In accordance with the supplier's sourcing, at step 410, the warehouse, vendor, or manufacturer ships the order using any of a variety of authorized carrier services, including their own in house carriers. In step 412, the warehouse, vendor, or manufacturer returns a description of all pertinent shipping information (e.g., carrier used tracking numbers, etc.) associated with a particular order. In step 414, the supplier receives a request from a customer to track the delivery status of the order. The supplier, in step 416, in response to the request, formulates and transmits an internal request for tracking information from the carrier's web site. In response, the carrier's web site returns the relevant information to the supplier in step 418, which is then displayed to a customer in step 420. By integrating carrier tracking information into the supplier's web site, the customer is not forced to navigate away from the supplier's site and navigate back to continue business with the supplier. In this manner, the supplier provides the most recent delivery status information to customers for all orders placed within a predetermined period of time (e.g., the last 30 days) from all authorized carriers having web tracking capabilities.

Figure 5:
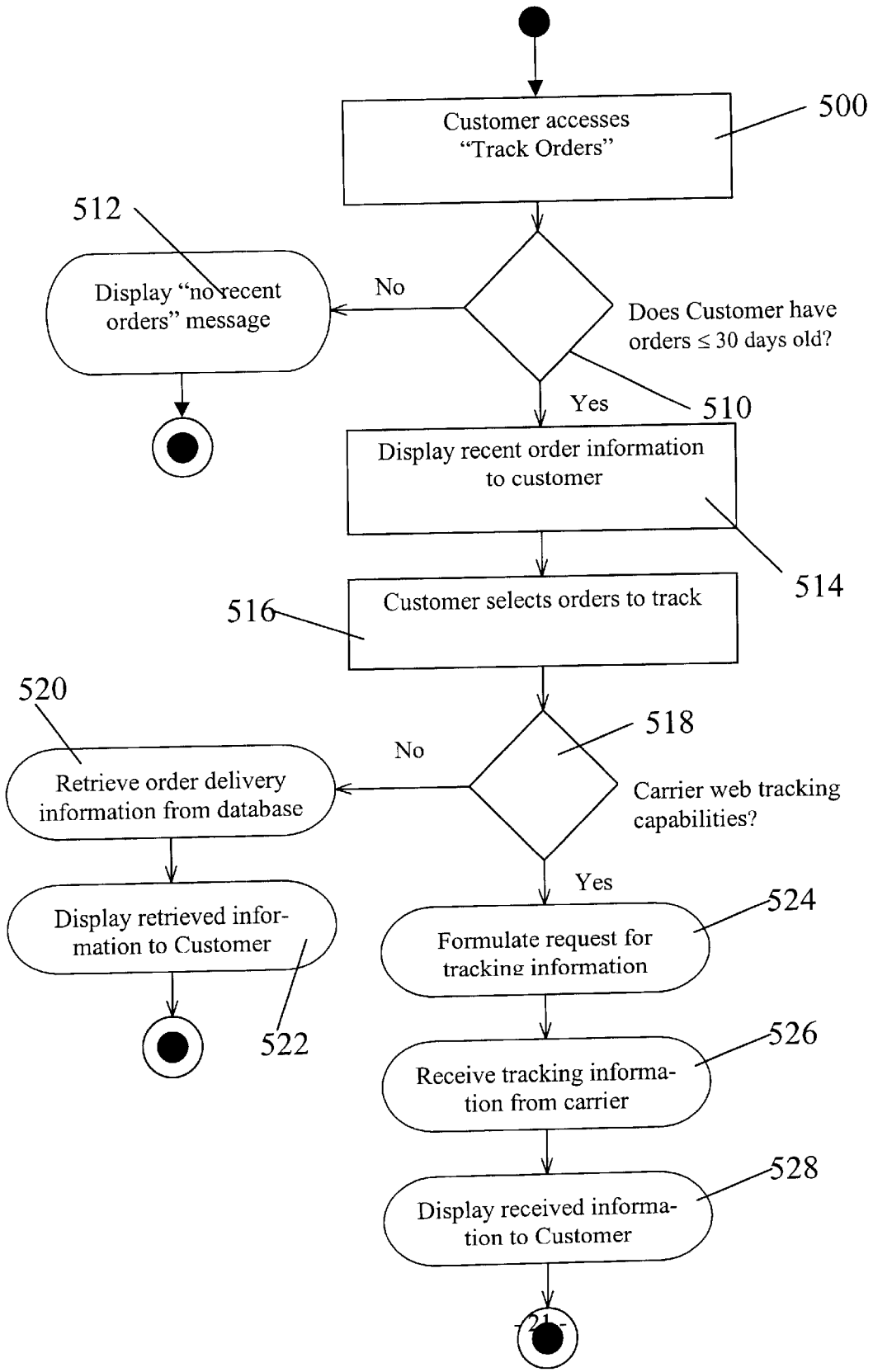
FIG. 5 is a flow chart describing a process for enabling customers to track the delivery status of orders placed in the commercial transaction.

Referring now to FIG. 5, there is shown a flow chart describing a method for enabling customers to track the delivery status of a recent order, in accordance with the present invention. In step 500, the customer accesses a shipment tracking web page via the network. Upon entry of a unique username and password, the server determines, in step 510, whether the customer has submitted any orders within a predetermined period of time (e.g., the last 30 days). If not, the server displays a message at step 512 indicating that no recent orders have been submitted. If at least one recent order has been submitted, the server displays a listing of all such orders in step 514. In step 516, the customer is asked to select an order to track. Upon the selection of a particular order, the server, in step 518, determines whether the carrier has web tracking capabilities on its web site. If the carrier does not have web tracking capabilities, the server, in step 520, references the tracking information database discussed above in FIG. 3 and displays, in step 522, the retrieved delivery status information to the customer. If the carrier does have web tracking capabilities, the server, in step 524, formulates and transmits an internal request for tracking information from the carrier's web site. In step 526, the server receives tracking information from the carrier's web site and displays, in step 528, the information to the customer. In this manner, the customer is able to track the progress of recent orders regardless of the carrier by which they are being shipped and without the need to navigate off of the supplier's web site.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method of providing online tracking of delivery status information of a plurality of orders over a computer network, comprising the steps of:

communicating delivery status information regarding at least one order from at least one non-web tracking carrier shipping the at least one order to a server associated with a supplier from whom the at least one order originated, storing the delivery status information on the server, receiving, at the server, a request from a customer to view delivery status information for a selected order, determining whether a carrier shipping the selected order is a web tracking carrier or a non-web tracking carrier, retrieving the stored delivery status information from the server if it is determined that the carrier shipping the selected order is a non-web tracking carrier, formulating an internal request for delivery status information for the selected order if it is determined that the carrier is a web tracking carrier, transmitting said internal request to the carrier, receiving delivery status information from the carrier for the selected order, and displaying the delivery status information to the customer.

2. The method of claim 1, wherein the at least one non-web tracking carrier includes at least two different non-web tracking carriers shipping at least two different orders, and further comprising the step of storing the delivery status information of each order on the server.

3. The method of claim 1, wherein the step of communicating delivery status information is performed only when the order is less than a predetermined age.

4. The method of claim 3, wherein the predetermined age is 30 days.

5. The method of claim 1, wherein the step of communicating delivery status information comprises communicating the delivery status information by electronic data interchange.

6. The method of claim 5, further comprising the step of formatting the delivery status information, by the at least one carrier into a predefined common format for delivery by electronic data interchange.

7. The method of claim 1, wherein the step of communicating delivery status information comprises hand keying the delivery status information into the server.

8. The method claim 7, wherein the step of hand keying the delivery status information is performed by a supplier associated with the server upon personal contact with the at least one carrier.

9. The method of claim 7, wherein the step of hand keying the delivery status information is performed by the at least one carrier over a computer network.

10. The method of claim 1 further comprising the step of automatically updating, at the server, delivery status information regarding the at least one order from the at least one non-web tracking carrier pursuant to a predetermined schedule.

11. The method of claim 1 further comprising the step of periodically updating, at the server, delivery information regarding the at least one order from the at least one non-web tracking carrier.

12. The method of claim 1 further comprising storing the delivery status information in a database on the server.

13. The method of claim 1, further comprising the step of determining the age of the selected order.

14. The method of claim 13, further comprising the step of displaying an error message to the customer when the age of the selected order is greater than a predetermined age.

15. The method of claim 14, wherein the predetermined age is 30 days.

16. A method of providing online tracking of delivery status information of orders over a computer network, comprising the steps of:

receiving, at a server, a plurality of orders from at least one customer, sourcing the plurality of orders from a warehouse for delivery to the at least one customer, receiving, from the warehouse, shipping information relating to each of the plurality of orders, the shipping information including a carrier designation and a unique order designation assigned by the carrier, the carrier designation limited to one of several authorized carriers, wherein at least one of the carriers is a non-web tracking carrier, storing the shipping information for each of the plurality of orders on the server, communicating delivery status information to the server utilizing the unique order designation regarding at least one order from at least one non-web tracking carrier shipping the at least one order, storing the delivery status information on the server, receiving, at the server, a request from a customer to view delivery status information for a selected order, determining whether a carrier shipping the selected order is a web tracking carrier or a non-web tracking carrier, retrieving the stored delivery status information from the server if it is determined that the carrier shipping the selected order is a non-web tracking carrier, formulating an internal request for delivery status information for the selected order if it is determined that the carrier is a web tracking carrier, transmitting said internal request to the carrier, receiving delivery status information from the carrier for the selected order, and displaying the delivery status information to the customer.

17. The method of claim 16, wherein the step of communication delivery status information further comprises establishing electronic data interchange between the at least one non-web tracking carrier and the server.

18. The method of claim 17 further comprising the step of:

preparing, by the at least one non-web tracking carrier, the delivery status information into a predetermined common format for delivery by electronic data interchange.

19. The method of claim 16, further comprising the step of periodically updating, at the server, the delivery status information regarding the orders shipped by the at least one non-web tracking carrier.

20. The method of claim 16, further comprising the step of automatically updating, at the server, delivery status information regarding the plurality of orders pursuant to a predetermined schedule.

21. The method of claim 16 wherein the shipping information is stored in a first database and the delivery status information is stored in a second database.

22. A computer readable storage medium for incorporating instructions for providing online tracking of delivery status information orders, the instructions comprising:

communicating delivery status information regarding at least one order from at least one non-web tracking carrier shipping the at least one order to a server associated with a supplier from whom the at least one order originated, storing the delivery status information on the server, receiving, at the server, a request from a customer to view delivery status information for a selected order, determining whether a carrier shipping the selected order is a web tracking carrier or a non-web tracking carrier, retrieving the stored delivery status information from the server if it is determined that the carrier shipping the selected order is a non-web tracking carrier, formulating an internal request for delivery status information for the selected order if it is determined that the carrier is a web tracking carrier, transmitting said internal request to the carrier, receiving delivery status information from the carrier for the selected order, and displaying the delivery status information to the customer.

* * * * *